Figure 1:
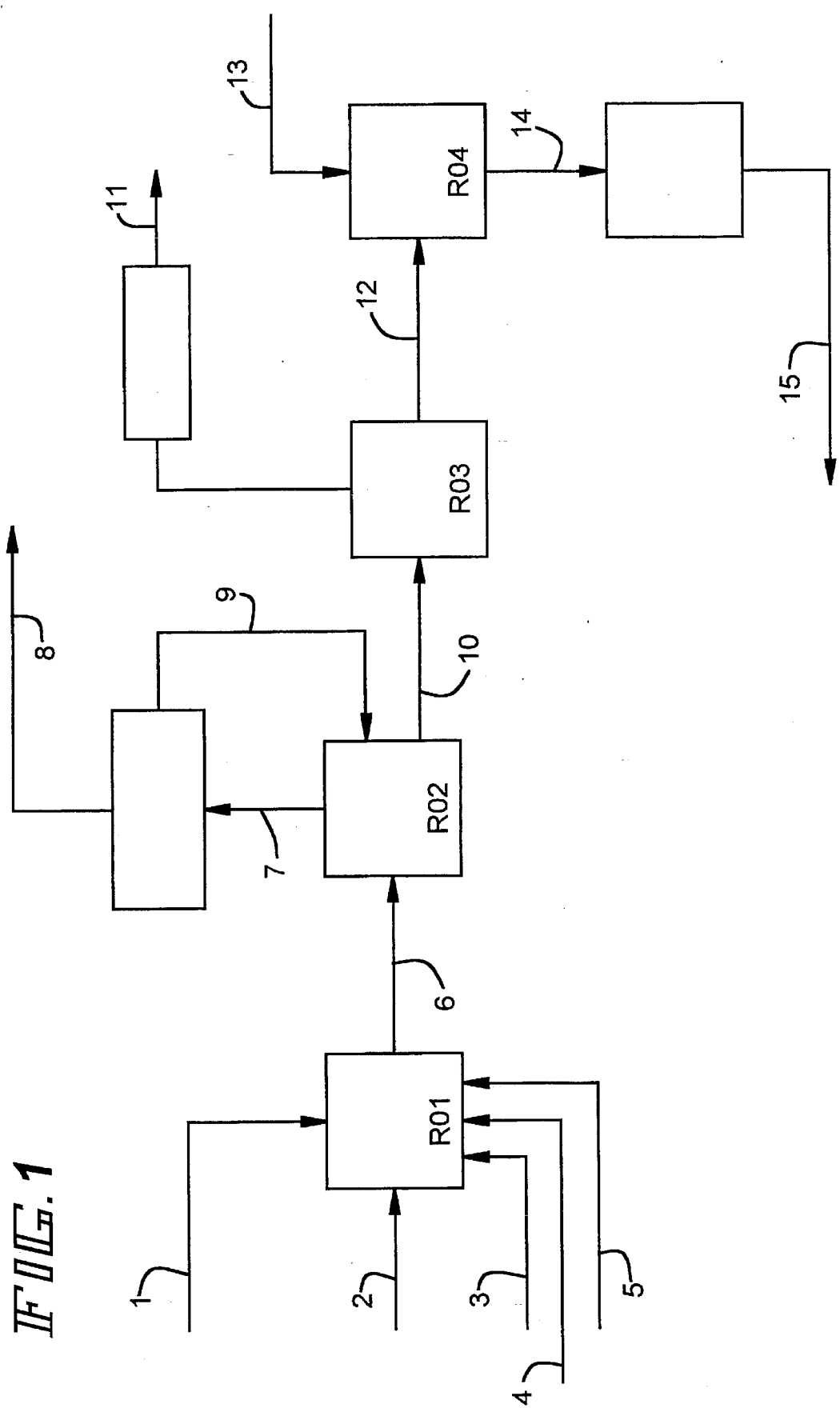

United States Patent [19]

Al Ghatta et al.

[11] Patent Number: 5,569,510
[45] Date of Patent: Oct. 29, 1996

[54] PROCESS FOR THE PRODUCTION OF POLYESTER RESINS FOR FIBERS

[75] Inventors: Hussain A. K. Al Ghatta, Fiuggi; Mario Pizzetti, Colleferro, both of Italy

[73] Assignee: Sinco Engineering S.p.A., Italy

[21] Appl. No.: 196,175

[22] PCT Filed: Jun. 11, 1993

[86] PCT No.: PCT/EP93/01447

§ 371 Date: Apr. 11, 1994

§ 102(e) Date: Apr. 11, 1994

[87] PCT Pub. No.: WO93/25600

PCT Pub. Date: Dec. 23, 1993

[30] Foreign Application Priority Data

Jun. 10, 1992 [IT] Italy .................... MI92A1424

[51] Int. Cl.$^6$ .................... D02G 3/00; C08G 69/26
[52] U.S. Cl. .................... 428/364; 528/272; 528/302; 528/308; 528/308.2; 528/308.3; 528/308.6; 528/350; 528/481; 528/503; 525/437
[58] Field of Search .................... 525/437; 528/272, 528/302, 308, 308.2, 308.3, 308.6, 350, 481, 503; 428/364

[56] References Cited

U.S. PATENT DOCUMENTS

| | | | |
|---|---|---|---|
| 2,965,613 | 12/1960 | Milone et al. | 528/305 |
| 3,446,778 | 5/1969 | Waller et al. | 525/445 |
| 3,553,157 | 1/1971 | Dijkstra et al. | 523/444 |
| 4,176,101 | 11/1979 | Leslie et al. | 260/22 T |
| 4,234,708 | 11/1980 | Edelman et al. | 525/444 |
| 4,273,890 | 6/1981 | Hirzy | 525/129 |
| 4,382,131 | 5/1983 | Binsack et al. | 525/445 |
| 4,598,129 | 7/1986 | Borman et al. | 525/439 |
| 4,686,262 | 8/1987 | Binsack et al. | 525/177 |
| 4,708,975 | 11/1987 | Shain | 523/216 |
| 4,880,860 | 11/1989 | Blocker | 524/94 |
| 4,942,219 | 7/1990 | Yatsuka et al. | 528/272 |
| 4,981,908 | 1/1991 | Wolfe, Jr. | 525/92 |
| 5,000,991 | 3/1991 | Hayashi et al. | 428/36.5 |
| 5,049,235 | 9/1991 | Barcus et al. | 162/9 |

FOREIGN PATENT DOCUMENTS

| | | |
|---|---|---|
| 0095189 | 11/1983 | European Pat. Off. . |
| 182352 | 5/1986 | European Pat. Off. . |
| 422282 | 4/1991 | European Pat. Off. . |
| 2250782 | 11/1974 | France . |
| 2211075 | 9/1973 | Germany . |
| 3323940 | 1/1985 | Germany . |
| 7016471 | 6/1970 | Japan . |
| 1027613 | 4/1966 | United Kingdom . |
| PCT/NL90/00152 | 3/1991 | WIPO . |
| PCT/EP92/00669 | 10/1992 | WIPO . |
| PCT/EP92/00668 | 10/1992 | WIPO . |
| PCT/EP92/00667 | 10/1992 | WIPO . |
| PCT/EP92/00670 | 10/1992 | WIPO . |
| PCT/EP92/02375 | 4/1993 | WIPO . |

OTHER PUBLICATIONS

Yamamoto, et al., "Thermoplastic Polyester Resin Composition", Chemical Abstracts, vol. 89, No. 16, Oct. 16, 1978.
Mizuno, et al., "Fire-resistant Polyester Compositions", Chemical Abstracts, vol. 90, No. 4, Jan. 1, 1979.
Patent Abstracts of Japan, vol. 9, No. 78, Apr. 6, 1985.

Primary Examiner—Samuel A. Acquah
Attorney, Agent, or Firm—Edward D. Manzo; Ted K. Ringsred; Mark J. Murphy

[57] ABSTRACT

Process for the production of polyester resins suitable for the manufacture of fibers including a phase of esterification of an aromatic dicarboxylic acid with an alkylenic glycol or of transesterification of a diester of the dicarboxylic acid with the alkylenic glycol, of polycondensation of diester obtained to form a prepolymer with intrinsic viscosity between 0.2 and 0.5 dl/g and, lastly, of polycondensation of the melt polymeric mass added with a dianhydride of a tetracarboxylic acid kept in agitation and on which an inert gas current is circulated.

10 Claims, 1 Drawing Sheet

PROCESS FOR THE PRODUCTION OF POLYESTER RESINS FOR FIBERS

This application is a 371 of PCT/EP93/01447, filed Jun. 8, 1993.

The present invention relates to a process for the production of polyester resins suitable for the manufacture of fibers and cords.

The polyester resins continuous production generally includes three stages: in the first one the esterification between an alkylenic glycol and an aromatic dicarboxylic acid, particularly terephthalic acid or the transesterification between an alkylenic glycol and a diester of dicarboxylic acid is carried out; the obtained product, prevalently formed of bis-beta-hydroxylethyleneterephthalate and of its oligomers, is passed to the second stage where it is polycondensed as polymer with higher molecular weight and finally it is further polycondensed in a third stage to the desired degree of intrinsic viscosity.

The melt polymeric mass can be sent to feed directly a spinnerets system; in this way the pelletization stage is avoided.

The reactor of the end stage polycondensation is generally formed by a cylinder with a rotating horizontal shaft, which maintains the highly viscous melt polymeric mass under agitation in order to allow the glycol removal from the melt mass.

The reactor is kept under high vacuum (less than 1.5 mm Hg) and the temperature is generally between 240° and 330° C.

Relatively long residence times are necessary to obtain the required intrinsic viscosity degree of the polymer resin (generally higher than 0.6 dl/g).

To increase the polycondensation speed it has been proposed to submit to polycondensation the bis-hydroxyethylene-terephthalate and its oligomers by feeding them as very thin film on an endless conveyor band (published Japanese application No. 5119/73 and European application No. 182 352).

The proposed method is very expensive and requires complicated equipment.

British patent No. 1,027,613 describes a method for polyester resins preparation suitable for fibers manufacture provided with better toughness, where the polycondensation stage is carried out in the presence of small quantities (0.1–2% mole on starting dicarboxylic acid) of a compound with three or more functional groups able to react with the ON and COOH endgroups.

Examples of utilizable polyfunctional compounds are glycerine, trimethylpropane, pentaerythrite, polycarboxylic acids, as trimesic acid and their anhydrides as trimellitic and pyromellitic anhydride.

The resulting polyesters are branched; the branching degree is not controllable, as the operating reaction conditions of high vacuum and the presence of the branching agent, do not allow to obtain reproducible results (see U.S. Pat. No. 4,217,440 that mentions the method of the above mentioned GB-1,027,613 patent, as example of conditions leading to non reproducible results).

Because the reaction cannot be controlled it is possible the formation of crosslinked products.

In the case of polyester resins preparation for fibers it is strongly requested that the polymer is linear.

It has now been found that it is possible to prepare polyester resins at high linearity degree with a simplified method which avoids the use of vacuum in the polycondensation end stage.

It has been unexpectedly found that by adding to the melt polymeric mass of the polycondensation end stage small quantity of a dianhydride of an aromatic tetracarboxylic acid and by passing an inert gas stream over the melt mass kept under agitation, it is possible to obtain, with high polycondensation speed, polyester resins of high molecular weight and substantially linear.

The result is unforseeable if one considers that the use of polyfunctional compounds as the dianhydrides of polycarboxylic acids in the polycondensation process leads to the uncontrolled formation of branched polyester resins containing crosslinking.

In the invention process, the dianhydride is used in a quantity between 0.1–3% by weight of the polyester resin.

The preferred dianhydride is pyromellitic anhydride.

The residence time is generally comprised between 5 and 30 minutes, preferential 10–20 minutes.

The amount of inert gas circulating (with preference azote) is at least 0.1% by weight of the polymeric mass.

The invention process includes therefore an esterification stage of an aromatic dicarboxylic acid with an alkylenic glycol or a transesterification stage of a diester of a dicarboxylic acid with an alkylenic glycol, of precondensation of the diester and of its oligomers till to obtain a polymer with intrinsic viscosity between 0.2 and 0.5 dl/g of addition to the melt polymeric mass of a dianhydride of a tetracarboxylic acid and of polycondensation of the mass till to obtain the desired intrinsic viscosity, this last stage being carried out in an agitated reaction vessel wherein an inert gas stream is circulated.

The esterification or transesterification and the subsequent polycondensation are made under the conditions known to the technicians skilled in the art (see "Encyclopedia of Polymer Science and Engineering" John Wiley a Sons, second edition, volume 12, pages 43–46 and 132–135, the description of which is here incorporated by reference). The usable catalysts are of known type.

Preferably the aromatic dicarboxylic acid is terephthalic acid and naphthalendicarboxylic acids and the esters thereof are the dimethylic esters.

The final polycondensation phase is carried out at temperature between around 240° and 330° C.

The melt polymer coming out of this phase has an intrinsic viscosity higher than 0.5–0.6 dl/g, and in general between 0.6 and 0.7 dl/g. It can be sent to directly feed the spinnerets of a spinning equipment.

The process is preferably carried out in continuous and is conveniently applied to the preparation of fibers from polyethylenterephthalate or copolyethylenterephthalate containing up to around 20% of units deriving from isophtalic acid.

The polyester resins obtained with the invention process are characterised by high thermal stability, this because the reaction of the end hydroxylic groups with the dianhydride leads to a decrease of the concentration of the same.

The fibers originating therefrom are provided with valuable mechanical properties; this allows high spinning speeds.

The following examples are given to illustrate and not to limit the invention.

The intrinsic viscosity reported in the examples and indicated in the text has been determined at 25° C. on a solution of 0.5 g resin in 100 ml of a phenol/tetrachloroethan solution at 60/40 ration by weight, according to ASTM D 4603–86.

EXAMPLE 1

Terephthalic acid combined with isophtalic acid (10% by weight), ethylene glycol (EG) and the catalyst system hereinbelow are continuously fed in a RO1 mixer (see block diagram).

The slurry is transferred by a pump to an esterification reactor (RO2) equipped with a stirrer and a distillation column.

The esterification water is continuously removed by a distillation column; the glycol is condensed and washed before being recycled to the esterification reactor.

The esterification product is moved to the prepolycondensation reactor (RO3) that is equipped with a stirrer and is linked to a vacuum system for glycol removal allowing to reach the desired intrinsic viscosity. The melt polymer is then transferred, still in continuous, to an RO4 reactor equipped with a stirrer where the polymer is added with pyromellitic anhydride and polycondensed up to obtain the desired intrinsic viscosity value.

The operation in the RO4 reactor is carried out in nitrogen direct stream.

The melt polymer coming out of the reactor feeds a pelletizing device.

The enclosed FIG. 1 shows the process scheme. The working conditions in the various sectors are:

|  | RO1 | RO2 | RO3 | RO4 |
|---|---|---|---|---|
| Temperature °C. | ambient | 240 | 270 | 270 |
| Pressure | ATM | 2.5 bar g. | 2 m bar | ATM |
| Residence time h. | 0.5 | 3 | 2 | 0.1 |
| Reactor volume l. | 20 | 150 | 100 | 10 |

The process conditions are shown in table 1.

In FIG. 1 it is indicated with 1 the feeding of a mixture of terephthalic and isophtalic acid, whose content varies from 5 to 15% by weight of isophtalic acid to the RO1; with 2 the feeding of ethylene glycol still in RO1; with 3, 4 and 5 the feeding of the catalytic system made up of $Sb_2 O_3$, polyphosphonate, Co acetate; with 6 the slurry coming out of the RO1 mixer; with 7 the steam coming out of the RO2 reactor; with 8 the water coming out of the distillation column; with 9 the ethylene glycol recycled to the RO2 reactor; with 10 the esterification product coming out of the RO2 reactor; with 11 the ethylene glycol coming out of the vacuum device; with 12 the melt polymer coming out of the RO3 reactor; with 13 the pyromellitic anhydride fed to the RO4 reactor; with 14 the melt polymer coming out of the RO4 reactor; with 15 the pelletized polymer.

After pelletizing, the polymer has an intrinsic viscosity of 0.55 dl/g.

The pelletized polymer is spun in a spinning device equipped with a 192 hole spinneret forming a 1,300 denier filament, having a tenacity of 4.1 g/denier and an elongation at break of 46%.

EXAMPLE 2

Working conditions are the same as in example 1; the only difference is that the pressure in the RO3 reactor is maintained at 5 m bar and the residence time is 3 hours. The amount of pyromellitic anhydride introduced into the RO4 reactor is 0.56 g/h. At the outlet of the RO3 reactor, the polymer has an intrinsic viscosity of 0.644 dl/g. The fiber has a tenacity of 4.9 g/denier and an elongation at break of 51%.

EXAMPLE 3

Working conditions are the same of example 1; the difference is that the pressure in the RO3 reactor is 2 m bar; the residence time is 2 hours. At the outlet of the RO3 reactor, the polymer has an intrinsic viscosity of 0.451 dl/g.

The amount of pyromellitic anhydride fed to the RO4 reactor is 0.16 Kg/h. The pelletized polymers have an intrinsic viscosity of 0.624 dl/g.

The fiber has a tenacity of 4.8 g/denier and an elongation at break of 49%.

TABLE 1

|  | Capacity Kg/h | I.V. dl/g | COOH meg/ton |
|---|---|---|---|
| Reference number 1 | 34.55 |  |  |
| Reference number 2 | 14.85 |  |  |
| Reference number 3 | 6.72* |  |  |
| Reference number 4 | 3.36* |  |  |
| Reference number 5 | 8.26* |  |  |
| Reference number 6 | 49.45 |  |  |
| Reference number 7 | 91.3 |  |  |
| Reference number 8 | 7.50 |  |  |
| Reference number 9 | 1.93 |  |  |
| Reference number 10 | 41.95 | 0.09–0.11 | 150–250 |
| Reference number 11 | 1.93 |  |  |
| Reference number 12 | 40.02 | 0.30 |  |
| Reference number 13 | 0.56 |  |  |
| Reference number 14 | 40.58 | 0.55 | 13–18 |
| Reference number 15 | 40.06 | 0.55 | 13–18 |

(*)in 3, 4 and 5 the capacity is in g/h

We claim:

1. Process for the continuous production of high molecular polyester resins comprising an esterification phase of an aromatic dicarboxylic acid with an alkylenic glycol or of a transesterification of a diester of said dicarboxylic acid with an alkylenic glycol, a polycondensation of the diester and its oligomers to form a melt polymer with intrinsic viscosity between 0.25 and 0.5 dl/g, addition to the melt polymer of a dianhydride of a tetracarboxylic acid, and subsequent further polycondensation carried out in an agitated reactor where an inert gas stream is circulated on the melt polymeric mass kept under agitation.

2. Process according to claim 1 where the dianhydride is chosen among the dianhydrides of aromatic tetracarboxylic acids and is fed to the polycondensation reactor in an amount between 0.1 and 3% by weight of the polymeric mass.

3. The process according to claim 1, wherein said dianhydride is pyromellitic anhydride.

4. The process according to claim 2, wherein said dianhydride is pyromellitic anhydride.

5. The process of claim 1, wherein said polyester resin is selected from the group consisting of polyethyleneterephthalate and copolyethyleneterephthalate containing up to 20% of units from isophthalic acid.

6. The process of claim 3, wherein said polyester resin is selected from the group consisting of polyethyleneterephthalate and copolyethyleneterephthalate containing up to 20% of units from isophthalic acid.

7. The process according to claim 1, Wherein the resin added with the dianhydride is polycondensed to obtain an intrinsic viscosity between 0.6 and 0.7 dl/g.

8. The process according to claim 5, wherein the resin added with the dianhydride is polycondensed to obtain an intrinsic viscosity between 0.6 and 0.7 dl/g.

9. Fibers made from polyester resins prepared according to the process of claim 1.

10. Fibers made from polyester resins prepared according to the process of claim 7.

\* \* \* \* \*